(12) United States Patent
Herraiz et al.

(10) Patent No.: US 9,790,802 B2
(45) Date of Patent: Oct. 17, 2017

(54) TURBINE ENGINE ROTOR INCLUDING BLADE MADE OF COMPOSITE MATERIAL AND HAVING AN ADDED ROOT

(75) Inventors: Ivan Herraiz, Pau (FR); Clement Roussille, Bordeaux (FR); Julien Mateo, Carignan de Bordeaux (FR); Alain Allaria, Le Taillan Medoc (FR); Jean-Luc Soupizon, Vaux le Penil (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 884 days.

(21) Appl. No.: 14/117,507

(22) PCT Filed: May 11, 2012

(86) PCT No.: PCT/FR2012/051048
§ 371 (c)(1),
(2), (4) Date: Dec. 27, 2013

(87) PCT Pub. No.: WO2012/156626
PCT Pub. Date: Nov. 22, 2012

(65) Prior Publication Data
US 2014/0205463 A1    Jul. 24, 2014

(30) Foreign Application Priority Data
May 13, 2011   (FR) ...................................... 11 54165

(51) Int. Cl.
*F01D 5/22*   (2006.01)
*F01D 5/28*   (2006.01)

(52) U.S. Cl.
CPC ............. *F01D 5/282* (2013.01); *F01D 5/225* (2013.01); *F05B 2240/33* (2013.01);
(Continued)

(58) Field of Classification Search
CPC . F01D 5/282; F01D 5/225; F01D 5/22; F01D 5/14; F01D 5/141; F01D 5/143;
(Continued)

(56) References Cited

U.S. PATENT DOCUMENTS

| 764,450 | A | * | 7/1904 | Geisenhoner | ............. | F01D 5/24 |
| | | | | | | 416/191 |
| 2,772,856 | A | | 12/1956 | Kent et al. | | |

(Continued)

FOREIGN PATENT DOCUMENTS

| EP | 0284829 A1 | 10/1989 |
| FR | 1055160 A | 2/1954 |

(Continued)

OTHER PUBLICATIONS

International Search Report for corresponding PCT Application No. PCT/FR2012/051048, dated Aug. 1, 2012.

*Primary Examiner* — Gregory Anderson
*Assistant Examiner* — Danielle M Christensen
(74) *Attorney, Agent, or Firm* — Workman Nydegger

(57) ABSTRACT

A turbine rotor includes a plurality of blades of composite material comprising fiber reinforcement densified by a matrix. Each blade comprises a blade body extending between an inner end having a blade root and an outer end forming the tip of the blade. The rotor also includes outer platform elements of composite material comprising fiber reinforcement densified by a matrix, each outer platform element including an opening in which the outer end of a blade is engaged. The portion of the outer end of each blade that extends beyond the outer platform element includes a slot or a notch for receiving a locking element.

13 Claims, 9 Drawing Sheets

(52) U.S. Cl.
CPC .. *F05D 2240/307* (2013.01); *F05D 2300/603* (2013.01); *Y02T 50/672* (2013.01); *Y10T 29/49337* (2015.01)

(58) Field of Classification Search
CPC . F01D 9/04; F01D 9/041; F01D 9/042; F01D 25/243; F01D 25/246; F05D 2300/603; F05D 2240/307; F05B 2240/33
See application file for complete search history.

(56) References Cited

U.S. PATENT DOCUMENTS

| | | | |
|---|---|---|---|
| 2,959,393 A | 11/1960 | Rankin | |
| 3,053,505 A * | 9/1962 | Welsh | F01D 5/225 416/192 |
| 3,065,955 A | 11/1962 | Harlin | |
| 4,840,539 A | 6/1989 | Bourcier et al. | |
| 7,926,761 B2 | 4/2011 | Coupe et al. | |
| 8,607,454 B2 | 12/2013 | Blanchard et al. | |
| 2006/0093847 A1 | 5/2006 | Hornick et al. | |
| 2007/0007386 A1 | 1/2007 | Coupe et al. | |
| 2007/0110583 A1 * | 5/2007 | McMillan | F01D 5/147 416/229 R |
| 2010/0144227 A1 | 6/2010 | Coupe et al. | |
| 2011/0127352 A1 | 6/2011 | Fachat et al. | |
| 2011/0311368 A1 | 12/2011 | Coupe et al. | |
| 2012/0055609 A1 | 3/2012 | Blanchard et al. | |

FOREIGN PATENT DOCUMENTS

| | | |
|---|---|---|
| FR | 1055161 A | 2/1954 |
| FR | 2928963 A1 | 9/2009 |
| FR | 2943942 A1 | 10/2010 |
| JP | S40027362 | 9/1940 |
| JP | H07279606 A | 10/1995 |
| JP | 2003148105 A | 5/2003 |
| JP | 2003214400 A | 7/2003 |
| JP | 2006130919 A | 5/2006 |
| JP | 2007332893 A | 12/2007 |
| WO | 2006136755 A2 | 12/2006 |
| WO | 2010061140 A1 | 6/2010 |
| WO | 2010116066 A1 | 10/2010 |

* cited by examiner

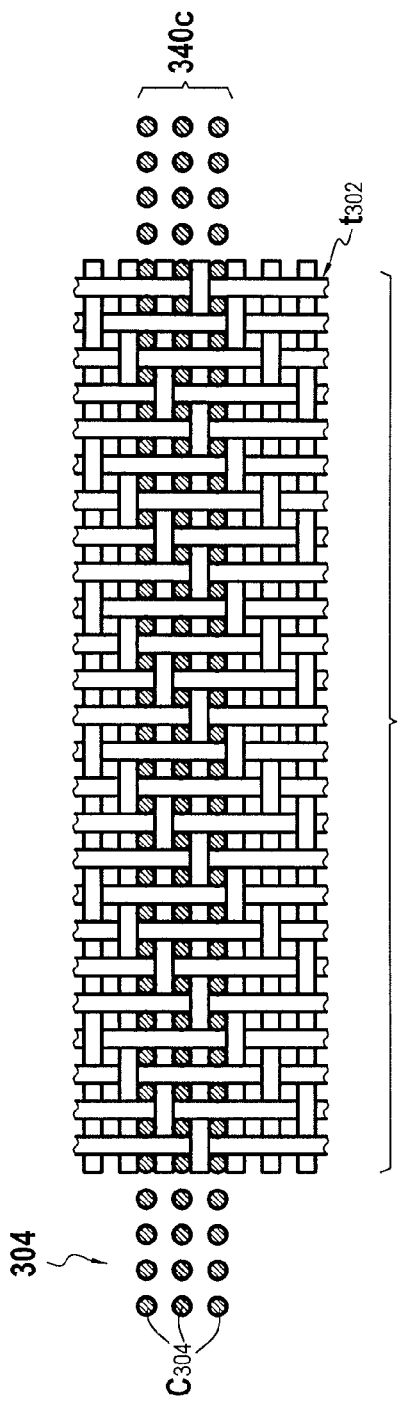
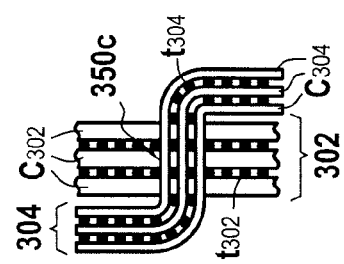
FIG.10A
FIG.10B

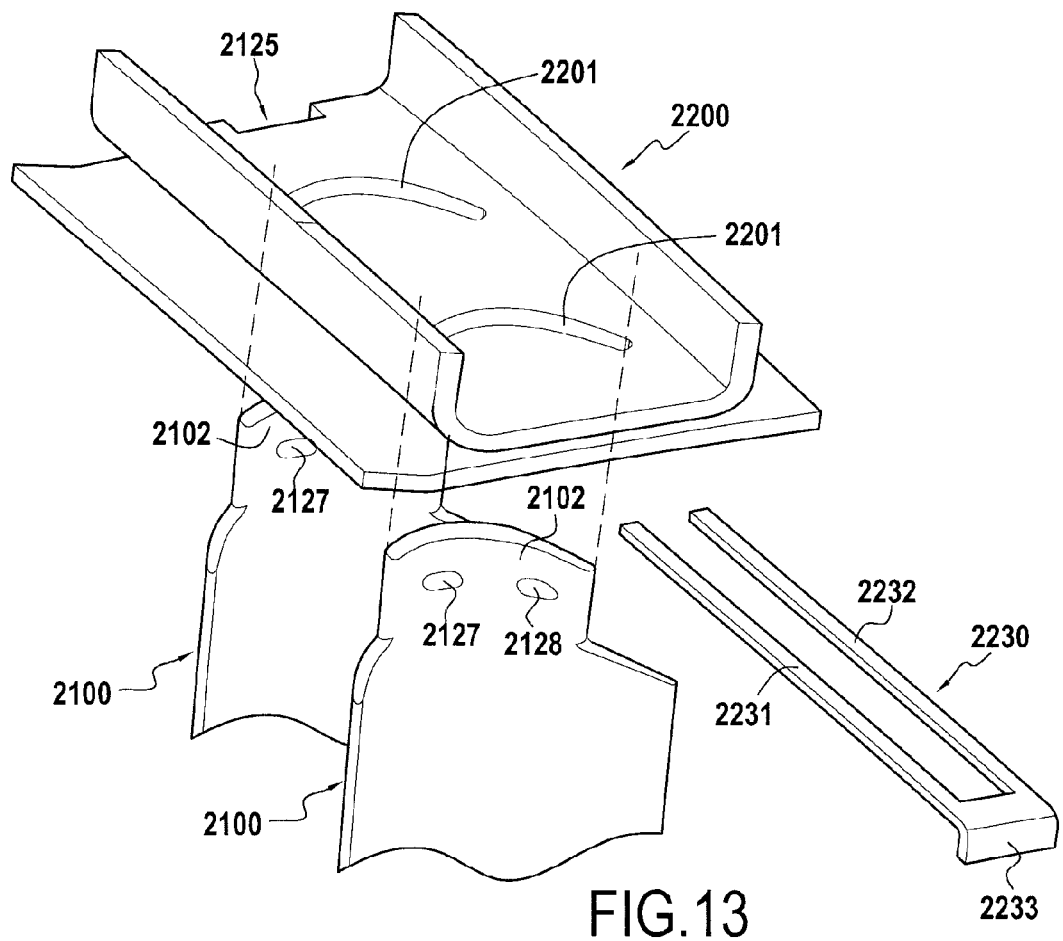
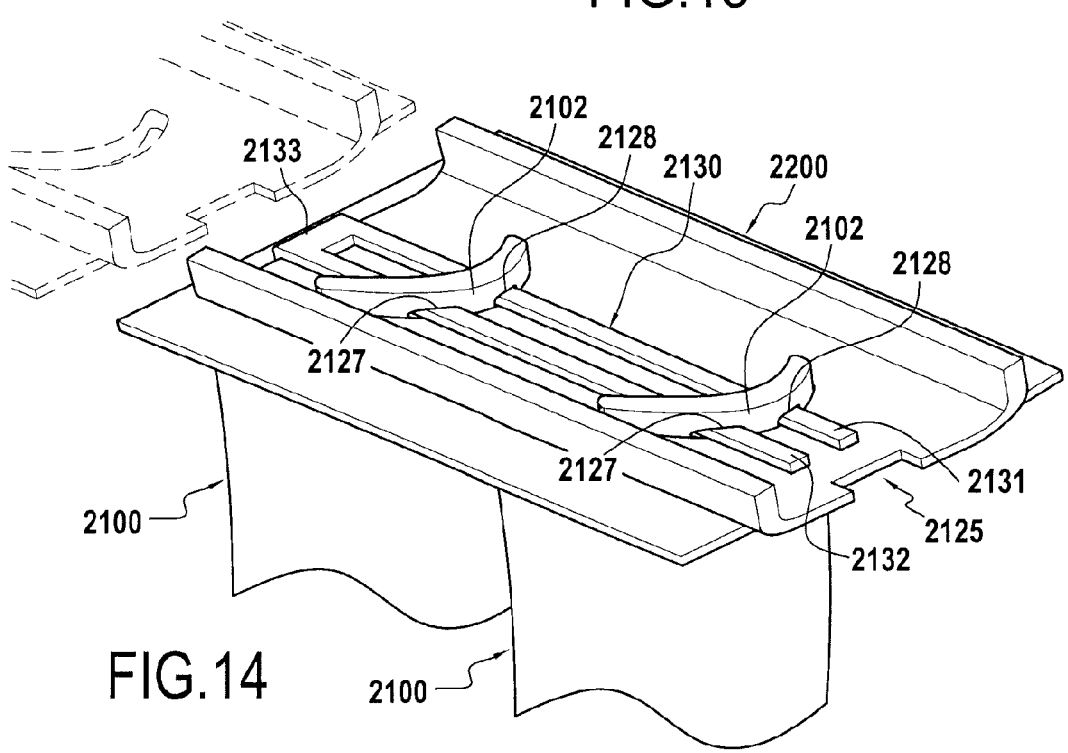

TURBINE ENGINE ROTOR INCLUDING BLADE MADE OF COMPOSITE MATERIAL AND HAVING AN ADDED ROOT

BACKGROUND OF THE INVENTION

The invention relates to turbine engine rotors fitted with blades made of composite material comprising fiber reinforcement densified with a matrix.

The intended field is that of gas turbine rotors for aeroengines or for industrial turbines.

Proposals have already been made for fabricating turbine engine rotors out of composite material. Reference may be made in particular to international patent application WO 2010/061140 filed jointly by Snecma and Snecma Propulsion Solide. That application describes fabricating a turbine engine blade out of composite material comprising fiber reinforcement densified by a matrix. More precisely, that method presents the feature of the fiber blank made by multilayer weaving incorporating two textures that cross each other so that, after shaping, they form a single-piece fiber preform having a first portion forming a preform for an airfoil and a blade root, and at least one second portion forming a preform for an outer platform of the blade. Thus, after the preform has been densified, it is possible to obtain a composite material blade having fiber reinforcement constituted by the preform and densified by the matrix, and forming a single piece having an outer platform incorporated therein.

Nevertheless, that technique for forming the blade root makes industrial fabrication of the blade more complex and increases fabrication costs because it gives rise to large losses of material and requires handling that is difficult and that slows down the speed of production. In addition, the operating clearances needed between the outer platforms give rise to leaks that reduce the overall performance of the turbine.

OBJECT AND SUMMARY OF THE INVENTION

It is therefore desirable to be able to have turbine engine rotors fitted with blades made of composite material, particularly but not necessarily of thermostructural composite materials such as ceramic matrix composite (CMC) material, for the turbines or compressors of turbine engines, which rotors are relatively simple to fabricate while nevertheless providing sealing, in particular at the outer platforms.

To this end, the invention provides a turbine rotor comprising at least one blade of composite material comprising fiber reinforcement densified by a matrix, each blade comprising a blade body extending between an inner end having a blade root and an outer end forming the tip of the blade, the rotor being characterized in that it includes at least one outer platform element of composite material comprising fiber reinforcement densified by a matrix, the outer platform element including at least one opening in which the outer end of a blade is engaged, the portion of the outer end of each blade that extends beyond the outer platform element including at least one slot or notch for receiving a locking element.

Compared with prior art rotors having composite material blades, the invention provides for fitting an outer platform on the tip(s) of one or more rotor blades. This design choice serves to simplify fabrication both of the blades and of the outer platform elements of the rotor and encourages industrialization of such components made out of composite material.

In addition, by deciding to fit on a separate outer platform element instead of making it integrally with the blade, greater freedom is made available in the design of this element, in particular in terms of its shape. This design choice also increases the accuracy of fabrication for mass production, thereby enabling fabrication tolerances to be made smaller and consequently reducing the operating clearances that are needed. This makes it possible to design outer platform elements that are suitable for reducing leaks and to improve the performance of the turbine at the outer profile of its gas stream passage.

Furthermore, the cost of repair is also reduced since in the event of a blade being damaged, or of an outer platform element being damaged, only the damaged part needs to be replaced.

In a first aspect of the rotor of the invention, the outer end of each blade presents dimensions that are smaller than the dimensions of the underlying portion of the blade body so as to define a shoulder forming a bearing surface for the outer platform element. This makes it easier to position outer platform elements thereon.

In a second aspect, each outer platform element has an outer platform overhang plate and an outer platform wiper plate.

In a third aspect, each outer platform element presents, at each of its longitudinal ends, an offset so as to enable two adjacent outer platform elements to overlap in part. This overlap makes it possible to improve the sealing of the gas stream passage between two adjacent outer platform elements that are pressed against each other in operation under the effect of centrifugal forces and under the effect of the retention provided by the locking element, while nevertheless complying with the profile for the passage. A damper device may also be arranged in the overlap portion.

In a fourth aspect, each outer platform element has a plurality of openings so as to engage each outer platform element with the outer ends of a plurality of adjacent blades. By uniting a plurality of blades with a shared outer platform element, leaks are reduced even more.

In a fifth aspect, the outer end of each blade extending beyond the outer platform element includes two slots or notches, each locking element having two arms respectively engaged in said slots or notches.

In a sixth aspect, each locking element includes, at one end, a rim that co-operates with a housing formed in each outer platform element so as to hold each locking element in position.

In an eighth aspect, each blade also includes all or part of an inner platform with or without overhangs and with or without an anti-tilting rim.

In a ninth aspect, the fiber reinforcement of each blade is obtained by multilayer weaving of yarns.

In a tenth aspect, each blade and each outer platform element is made of ceramic matrix composite (CMC) material or organic matrix composite (OMC) material.

The present invention also provides a compressor fitted with a rotor of the invention, and a turbine engine fitted with such a compressor.

The present invention also provides a method of fabricating a turbine engine rotor, the method comprising making at least one blade, the method comprising for each blade:

making a blade fiber blank as a single piece;

shaping the fiber blank so as to obtain a single-piece blade fiber preform having a first portion forming a preform for a blade airfoil and a blade root;

densifying the blade preform with a matrix in order to obtain a composite material blade having fiber reinforcement constituted by the preform and densified by the matrix, and comprising a blade body extending between an inner end comprising a blade root and an outer end forming a blade tip;

the method being characterized in that it further comprises:

making at least one slot or notch in the outer end of each blade;

making at least one single-piece fiber blank for an outer platform element;

shaping the fiber blank to obtain an outer platform element fiber preform;

densifying the outer platform element preform with a matrix to obtain an outer platform element of composite material having fiber reinforcement constituted by the preform and densified by the matrix;

making at least one opening in the outer platform element;

mounting each blade on a hub by engaging the root of each blade in a housing of complementary shape formed in the periphery of said hub;

mounting each outer platform element on at least one blade by engaging the outer end of the blade in the opening or notch in the outer platform element; and arranging a locking element in at least the slot in the outer end of each blade.

By fabricating the blade and the outer platform element out of composite material, industrial fabrication of the rotor is simplified while also improving sealing and improving the performance of the turbine, as explained above.

According to a feature of the method, the outer end of each blade is machined so as to define a shoulder forming a bearing surface for the outer platform element.

According to another feature, each outer platform element has an outer platform overhang plate and an outer platform wiper plate.

According to yet another feature, the fiber blank of each outer platform element is made by multilayer weaving between a plurality of yarn layers, the blank including partial zones of non-interlinking between two series of adjacent yarn layers, one of the two series of layers being folded out during shaping of the blank so as to form the wipers.

BRIEF DESCRIPTION OF THE DRAWINGS

The invention can be better understood from the following description given by way of non-limiting indication and with reference to the accompanying drawings, in which:

FIG. 10A is a fragmentary warp section view in a portion of the FIG. 6 fiber blank that corresponds to the location of the junction between the airfoil and the inner platform of the blade;

FIG. 10B is a fragmentary weft section view in the portion of the FIG. 6 fiber blank corresponding to the location of the junction between the airfoil and the inner platform of the blade;

FIGS. 13 and 14 are diagrammatic perspective views of a portion of a rotor in accordance with another variant embodiment of the invention.

DETAILED DESCRIPTION OF EMBODIMENTS

Figure 1:
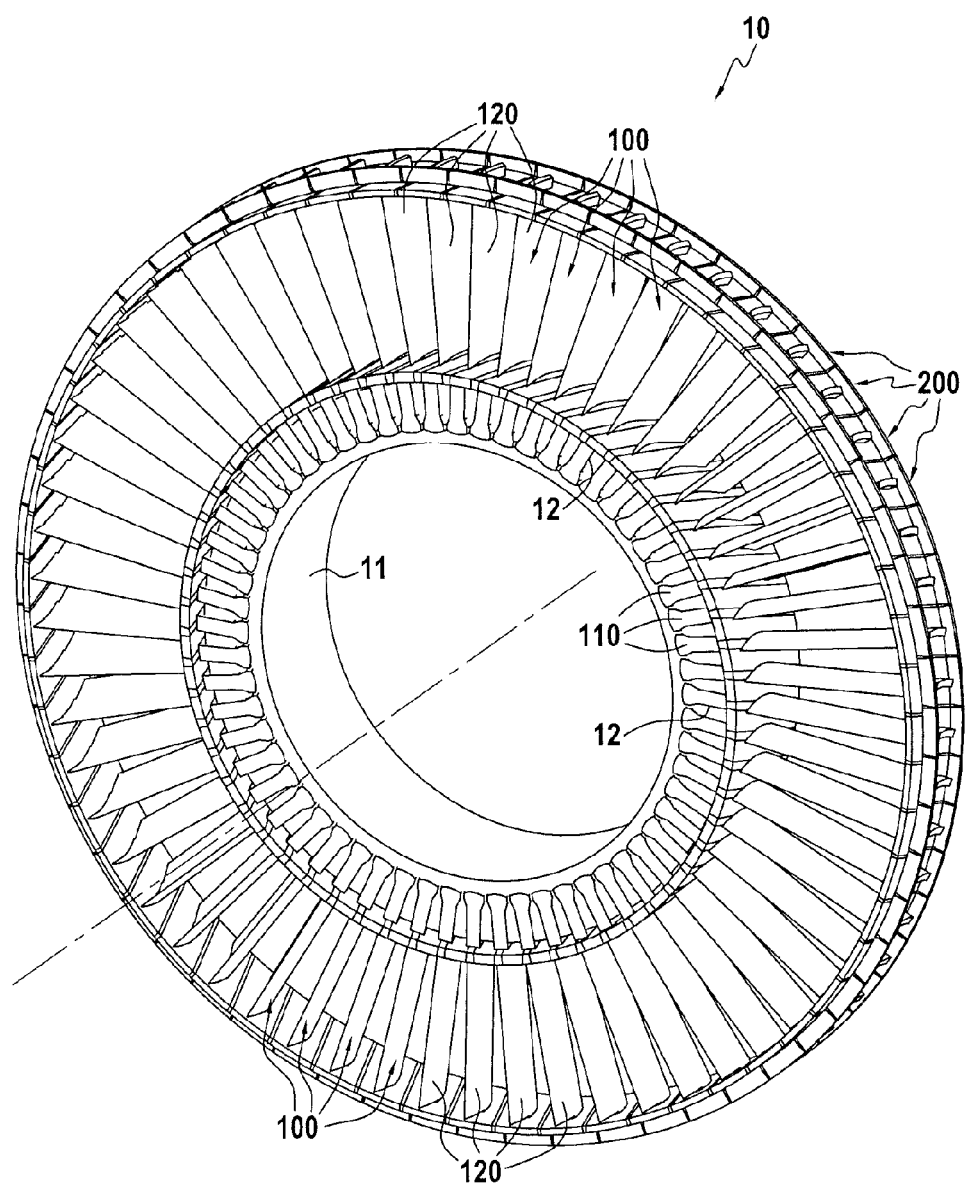
FIG. 1 is a perspective view of a turbine engine rotor in accordance with an embodiment of the invention.

The invention is applicable to various types of turbine rotor, and in particular to compressor and turbine rotors of various spools of a gas turbine, e.g. a rotor wheel of a low pressure (LP) turbine, such as that shown in FIG. 1.

FIG. 1 shows a turbine engine rotor 10 having a hub 11 with a plurality of blades 100 mounted thereon, each blade 100 comprising in conventional manner an airfoil 120 and a root 110 formed by a portion of greater thickness, e.g. having a bulb-shaped section, that is engaged in a complementary housing 12 formed in the periphery of the hub 11.

Figure 2:
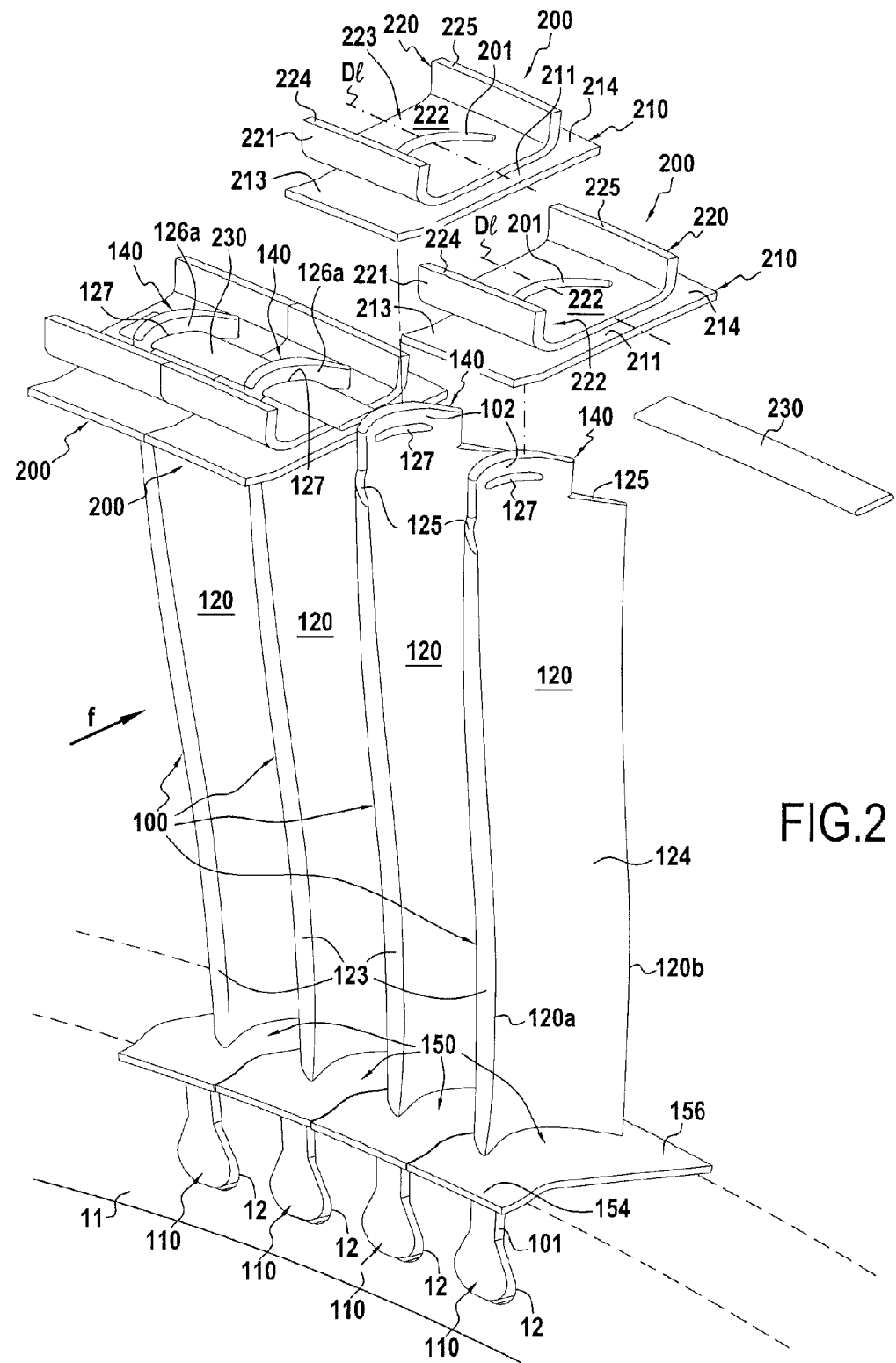
FIG. 2 is a detail view of a portion of the FIG. 1 rotor prior to mounting the outer platform elements.
Figure 3:
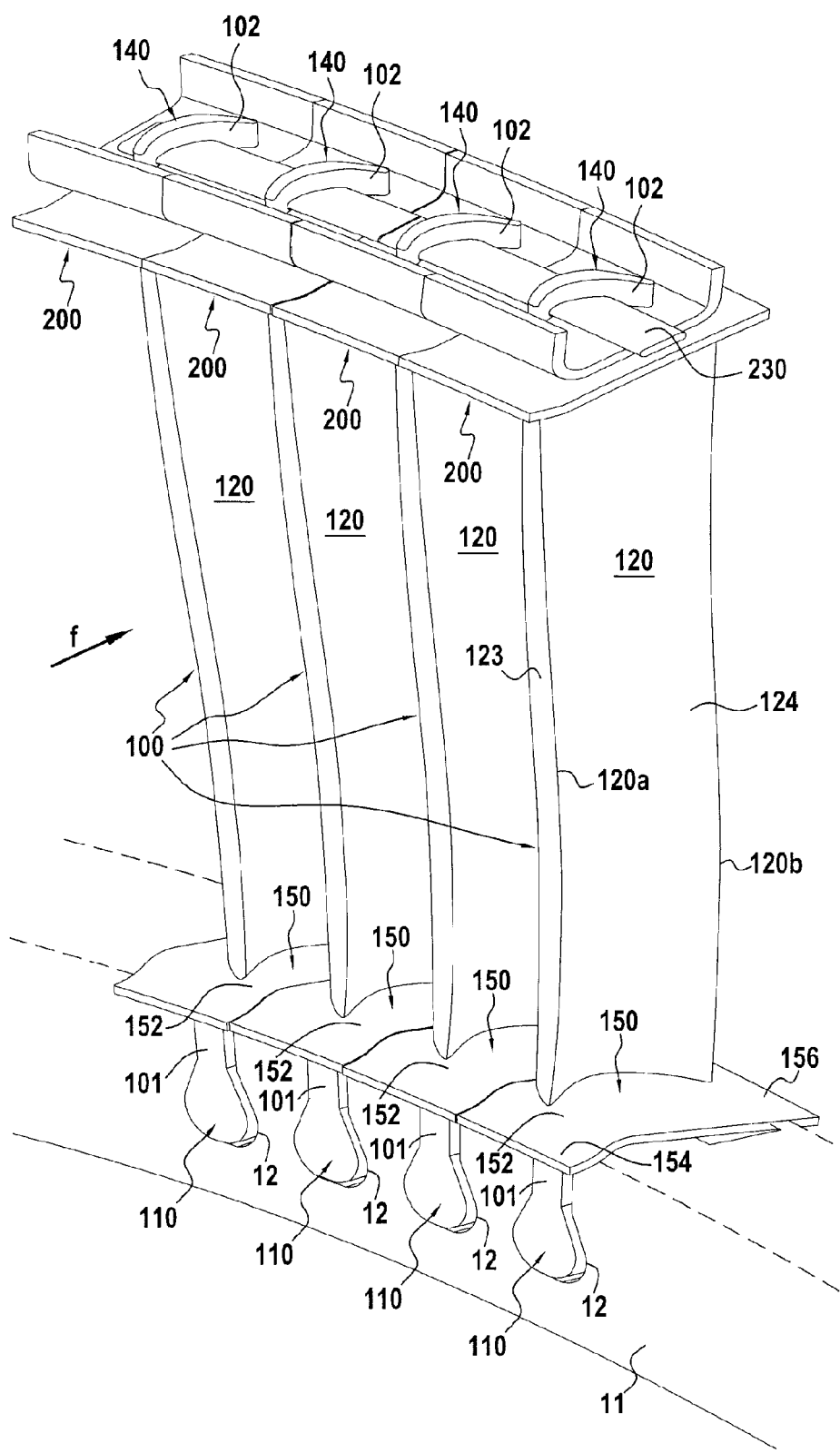
FIG. 3 is a detail view of a portion of the FIG. 1 rotor after the outer platform elements have been mounted.

In accordance with the invention, the rotor has a plurality of outer platform elements 200, each mounted on a respective blade 100. More precisely, and as shown in FIGS. 2 and 3, an airfoil 120 extends in a longitudinal direction between an inner end 101 of the blade including its root 110 and an outer end 102 forming the tip 140 of the blade 100. In cross-section, the airfoil presents a curved profile of varying thickness defining two faces 123 and 124, corresponding respectively to the suction side and to the pressure side of the airfoil 120 and each connecting together its leading edge 120a and its trailing edge 120b. In the presently-described example, the airfoil 120 also has an inner platform 150 with its outer (or top) face 152 defining the flow passage for a gas stream f, radially on the inside. In its upstream and downstream end portions in the direction of flow of the gas stream f, the inner platform 150 is terminated by covering overhangs 154 and 156.

Each outer platform element 200 in this example has an opening 201 engaged with the outer end of a blade 100. The opening 201 is of a shape and of dimensions that match the shape and dimensions of the outer end of each blade 100. In the presently-described example, the outer end 102 of each blade 100 that is engaged in an opening 201 of an outer platform element 200 is constituted by a portion 126 that presents dimensions that are smaller than the dimensions of the remainder of the body of the airfoil 120 so as to define a shoulder 125 forming a bearing surface for the outer platform element 200. Nevertheless, the outer platform element of the invention could equally well include openings of shape and dimensions adapted to passing an outer end of a blade that has not been made smaller than the remainder of the body of the airfoil.

In the presently-described example, the outer platform element 200 comprises an outer platform overhang plate 210 and an outer platform wiper plate 220 that is placed on the top face 211 of the overhang platform 210. In its upstream and downstream portions in the flow direction of the gas stream f, the outer platform overhang plate 210 is terminated by covering overhangs 213 and 214. In the example shown, the bottom face 212 of the outer platform overhang plate 210 extends substantially perpendicularly to the longitudinal direction of the blade. In a variant, and depending on the profile desired for the outside surface of the gas stream flow passage, the bottom face 212 could be inclined so that overall it forms a non-zero angle relative to the normal to the longitudinal direction of the blade, or the face 212 could have a profile that is generally not rectilinear, for example that is curved. The slope of the shoulder 125 is then adapted to match the shape of the bottom face 212 of the plate 210.

On its outer (or top) face 222, the outer platform wiper plate 220 defines a depression or bathtub 223. Along upstream and downstream edges of the bathtub 223, the plate 220 carries folded portions forming wipers 224 and 225 having profiles in the form of teeth with the ends of the teeth being suitable for penetrating into a layer of abradable material of a turbine ring (not shown) in order to reduce clearance between the blade tip and the turbine ring.

As shown in FIG. 3, the outer end portion 102 of each blade 100 that extends beyond the outer platform element 200, here the fraction 126a of the portion 126, includes a slot 127 that receives a locking element or key 230 for holding the outer platform element 200 in place on the outer end 102 of the blade 100, in particular against centrifugal forces. In the presently-described example, the locking element 230 presents a length that is substantially equivalent to the length of two outer platform elements 200 so as to be inserted into the slot 127 of two adjacent blades 100 and hold two adjacent outer platform elements 200 in place, the rotor having a plurality of locking elements 230 distributed around the outer periphery of the blades formed by the outer faces 222 of adjacent outer platform wiper plates 220 taken together. Naturally, the locking element could be of some other length, enabling it to be inserted into some other number of slots, such as, for example, a single slot or more than two slots at a time, thereby serving to hold one or more outer platform elements simultaneously.

Still in the presently-described example, the outer platform overhang plate 210 and the outer platform wiper plate 220 present equivalent lengths in their longitudinal direction De while nevertheless being offset relative to each other in this direction. Two offsets 211 and 221 are thus formed at the longitudinal ends of each outer platform element 200, thereby enabling partial overlap to be achieved between adjacent outer platform elements 200, and thus sealing the passage while complying with its profile.

Figure 4:
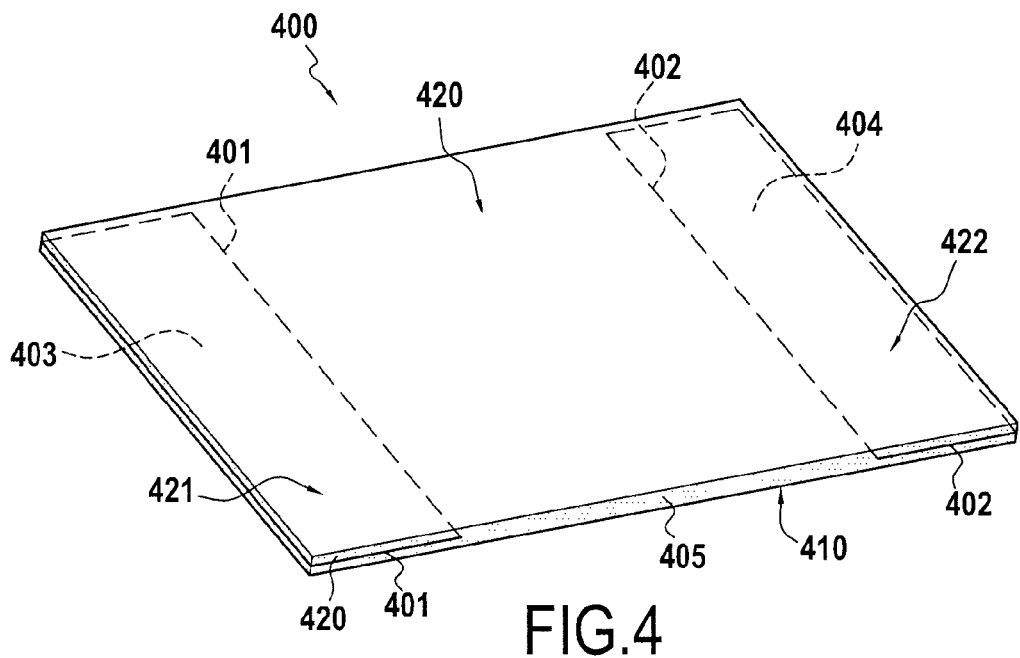
FIG. 4 is a highly diagrammatic view showing the preparation of a multilayer woven fiber blank for use in making an outer platform element such as that shown in FIGS. 2 and 3.

FIG. 4 is a highly diagrammatic view of a fiber blank 400 for forming the fiber characterized of the outer platform element, and from which it is possible to shape a fiber preform for an outer platform element so that once it has been densified by a matrix and machined, an outer platform element is obtained such as the element 200 shown in FIGS. 2 and 3.

In the presently-described example and as shown diagrammatically in FIG. 4, the fiber blank 400 is obtained by multilayer weaving between a plurality of layers of warp yarns and a plurality of layers of weft yarns. The multilayer weaving performed may in particular be weaving using an "interlock" weave, i.e. a weave in which each layer of weft yarns interlinks a plurality of layers of warp yarns, with all of the yarns in a given weft column having the same movement in the plane of the weave.

The blank 400 has first and second portions 410 and 420 that are respectively to form the outer platform overhang plate 210 and the outer platform wiper plate 220. During weaving, non-interlinking is arranged inside the fiber blank at 401 and 402 between two successive layers of warp yarns situated at the boundary between the portions 410 and 420 and occupying two respective non-interlinked zones 403 and 404. The portions 410 and 420 are interlinked in an interlinked zone 405 situated between the two non-interlinked zones 403 and 404. The non-interlinking at 401 and 402 makes it possible to form two respective portions 421 and 422 that can be folded out while shaping the blank in order to end up forming the wipers 224 and 225 of the wiper plate of the outer platform 220.

The fiber blank for forming the fiber reinforcement of the outer platform element may also be obtained by assembling together two fiber structures corresponding respectively to the first and second portions 410 and 420 of the above-described fiber blank 400. Under such circumstances, the two fiber textures should be linked together, e.g. by stitching or needling, solely in the interlinked zone 405, in order to form the two portions 421 and 422 that are suitable for being folded out while shaping the blank in order to end up forming the wipers 224 and 225 of the wiper plate of the outer platform 220. In particular, the two fiber textures corresponding respectively to the first and second portions 410 and 420 may each be obtained from a layer or a stack of a plurality of layers of:
  unidimensional (UD) fabric;
  two-dimensional (2D) fabric;
  braiding;
  knitting;
  felt; and
  a unidirectional (UD) sheet of tows or cables or multidirectional (nD) sheets obtained by superposing a plurality of UD sheets in different directions and linking the UD sheets together, e.g. by stitching, by a chemical bonding agent, or by needling.

For a stack of a plurality of layers, the layers are linked together, e.g. by stitching, by implanting yarns or rigid elements, or by needling.

Figure 5:
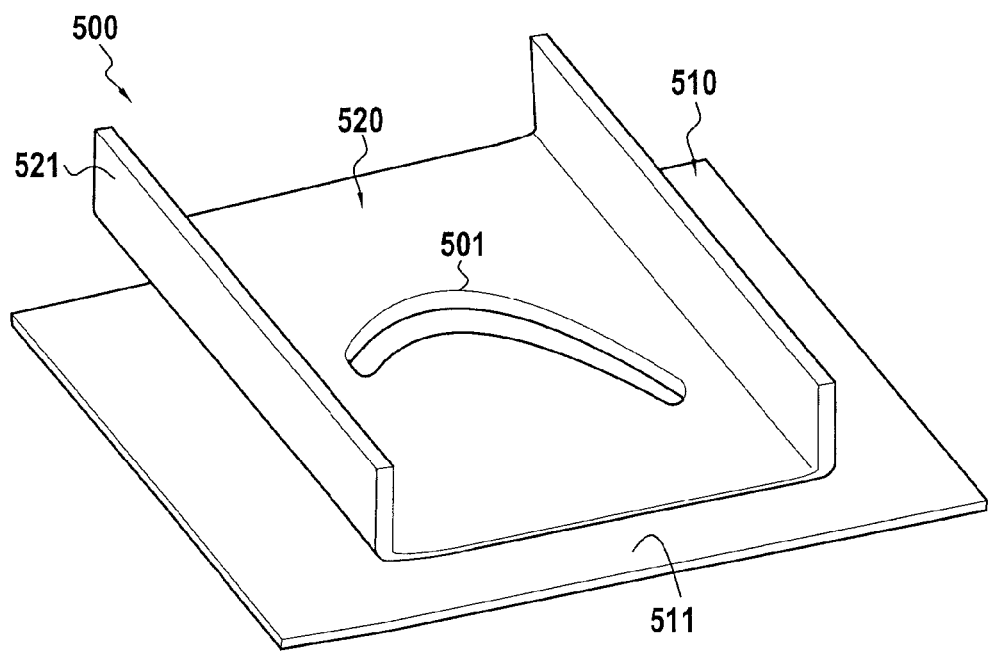
FIG. 5 shows the making of a fiber preform for an outer platform element of the kind shown in FIGS. 2 and 3, using the fiber blank of FIG. 4.

FIG. 5 is a highly diagrammatic view of a fiber preform 500 for the outer platform element that is to be made subsequently by molding, with the portion 410 being deformed so as to reproduce shapes that are similar to the shapes of the overhang plate of the outer platform, and with folding of the portions 421 and 422 of the portion 420 in order to reproduce shapes similar to the shapes of the wipers of the wiper plate of the outer platform. This produces a preform 500 with one portion 510 constituting a preform for the overhang plate of the outer platform and another portion 520 constituting a preform for the wiper plate of the outer platform. In order to form an outer platform element corresponding to the outer platform element 200 shown in FIGS. 2 and 3, offsets 511 and 521 are formed respectively at the longitudinal ends of the preform 500. When the fiber blank that is to form the outer platform element is obtained by multilayer weaving, the offsets are obtained by machining after the preform has been densified. When the blank is made by assembling together two fiber textures corresponding respectively to the overhang plate and to the wiper plate of the outer platform, the textures may be initially assembled together with a corresponding offset.

After densification, the preform 500 is machined so as to form an opening 501 having a shape and dimensions matching the shape and dimensions of the opening 201 in the outer platform elements that are to be fabricated. A fiber preform 500 is thus obtained that makes it possible, after being densified by a matrix and being machined, to obtain an outer platform element made of composite material such as the outer platform element 200 shown in FIGS. 2 and 3.

In order to avoid introducing differential thermal expansion coefficients between the blades and the outer platform elements, the blades and the elements are preferably made using fibers and matrices of the same kinds.

Furthermore, the locking elements 230 may be of a different material, such as a metal material, for example. Nevertheless, in order to avoid introducing differential thermal expansion coefficients and mechanical stresses between the blades, the platform elements, and the locking elements, the locking elements are preferably made of composite material having fibers and a matrix of the same kinds as those used for making the blades and the outer platform elements.

Figure 6:
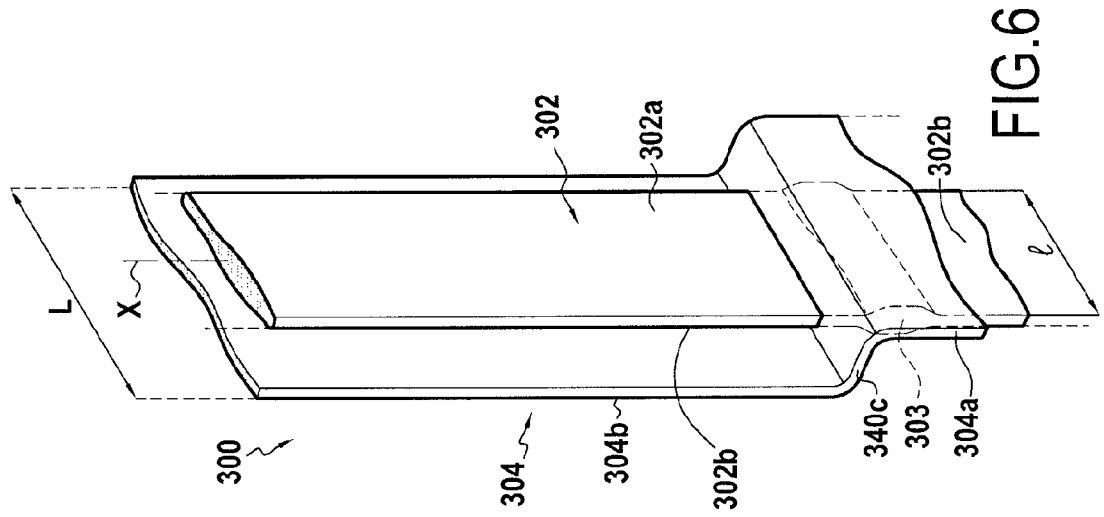
FIG. 6 is a highly diagrammatic view showing the arrangement of two sets of yarn layers in a multilayer woven fiber blank for making a fiber preform for a blade of the kind shown in FIGS. 2 and 3.

FIG. 6 is a very diagrammatic view of a fiber blank 300 from which a blade fiber preform can be shaped so that once it has been densified with a matrix, and possibly also machined, a composite material blade is obtained with an inner platform and an inner platform overhang plate incorporated therein such as the blade 100 shown in FIGS. 2 and 3.

The blank 300 comprises two fiber strips 302 and 304 obtained by three-dimensional weaving or multilayer weaving, with only the geometrical envelopes of these two portions being shown in FIG. 6. After being shaped, the fiber strip 302 is for constituting a portion of the blade fiber preform corresponding to an airfoil preform and a blade root, this portion presenting a face 302a that is to form the pressure side of the airfoil and a face 302b that is to form the suction side of the airfoil. After shaping, the fiber strip 304 is to constitute the portion of the blade fiber preform that corresponds to a preform for the inner platform.

The two fiber strips 302 and 304 extend generally in a direction X corresponding to the longitudinal direction of the blade to be made. In its portion that is to form an airfoil preform, the fiber strip 302 presents varying thickness that is determined as a function of the thickness of the profile of the airfoil of the blade that is to be made. In its portion that is to form a root preform, the fiber strip 302 presents extra thickness 303 that is determined as a function of the thickness of the root of the blade that is to be made.

The fiber strip 302 has a width l selected as a function of the length of the developed profile (when flat) of the airfoil and of the root of the blade to be made, while the fiber strip 304 has a width L greater than l that is selected as a function of the developed lengths of the inner platform to be made.

The fiber strip 304 is of substantially constant thickness that is determined as a function of the thicknesses of the blade in a platform to be made. The strip 304 has a first portion 304a that extends along and in the vicinity of a first face 302a (pressure side) of the strip 302, and a second portion 304b that extends along and in the vicinity of the second face 302b (suction side) of the strip 302.

The portions 304a and 304b are connected together by a connection portion 340c that extends transversely relative to the strip 302 at a location corresponding to the location of the inner platform to be made. The connection portion 340c passes through the strip substantially perpendicularly to the longitudinal direction of the fiber blank. Depending on the shape desired for the inner platform, the connection portion 340c may pass through the strip 302 at a non-zero angle relative to the normal to the longitudinal direction X of the blank. In addition, the profile of the connection portion 340c may be curvilinear instead of being rectilinear as in the example shown.

As described in greater detail below, the strips 302 and 304 are woven simultaneously by multilayer weaving, without any interlinking between the strip 302 and the portions 304a and 304b of the strip 304, and with a plurality of successive blanks 300 being woven continuously in the direction X.

Figure 8:
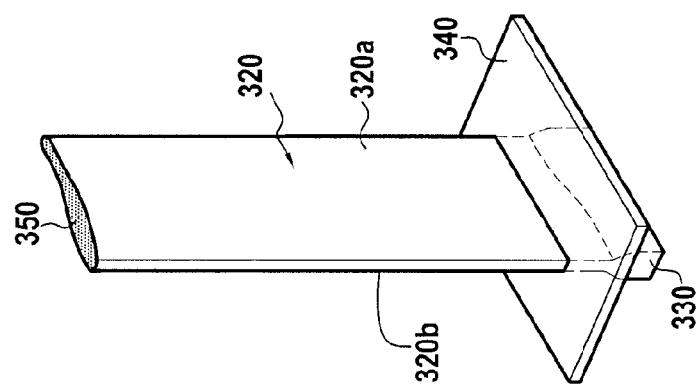
FIGS. 7 to 9 show successive steps in making a fiber preform for a blade of the kind shown in FIGS. 2 and 3, using the fiber blank of FIG. 6.
Figure 7:
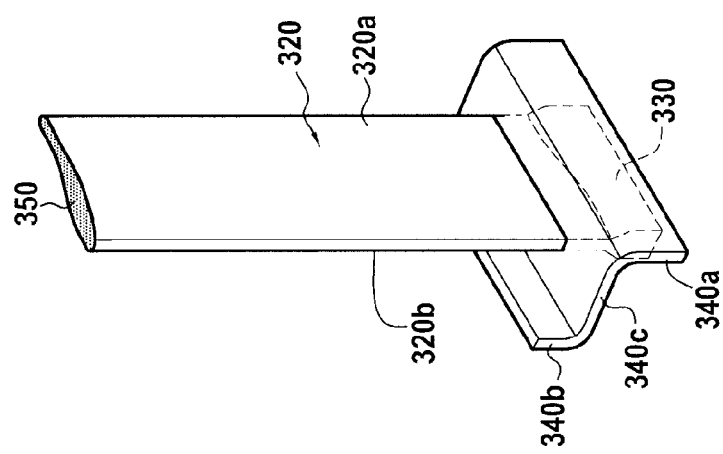
Figure 9:
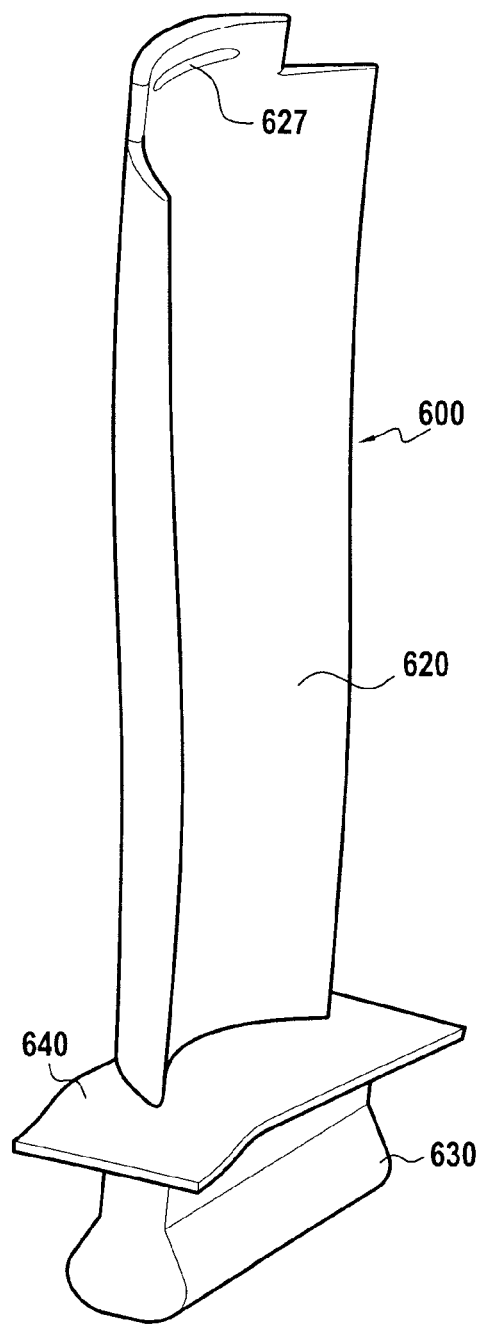

FIGS. 7 to 9 are highly diagrammatic views showing how a fiber preform of shape close to that of the blade that is to be fabricated can be obtained from the fiber blank 300.

The fiber strip 302 is cut through at one end in the extra thickness 303 and at another end in order to provide a strip 320 of length corresponding to the longitudinal direction of the blade that is to be fabricated, with an enlarged portion 330 formed by a portion of the extra thickness 303 and situated at a location corresponding to the position of the root of the blade that is to be fabricated and with an opposite end 350 corresponding to the tip of the blade that is to be fabricated. The strip 320 presents a face 320a for forming the pressure side of the airfoil and a face 320b for forming the suction side of the airfoil.

In addition, cuts are formed at the ends of the portion 304a and in the portion 304b of the strip 304 in order to leave segments 340a and 340b on either side of the connection portion 340c, as shown in FIG. 7. The lengths of the segments 340a and 340b are determined as a function of the lengths of the inner platform of the blade to be fabricated.

Because of the non-interlinking between the strip 320 of the fiber blank and the portions 304a and 304b, the segments 340a and 340b can be folded out perpendicularly to the strip 302 without cutting any yarns in order to form a plate 340, as shown in FIG. 8.

A fiber preform 600 of the blade that is to be fabricated is then obtained by molding, with the strip 320 being deformed to reproduce the curved profile of the blade airfoil and with the plate 340 being deformed to reproduce a shape similar to the shape of the inner platform, as shown in FIG. 9. After densification, the preform 600 is machined in order to form a slot 627 of shape and dimensions matching the shape and dimensions of the slots 127 in the blades to be fabricated. This produces a preform 600 with an airfoil preform portion 620, a root preform portion 630 (including a tang preform portion), and an inner platform preform portion 640.

When the fiber blanks of the outer platform element and of the blade are made by weaving, the weaving is performed using warp yarns that extend in the longitudinal direction X of the blank, it being understood that it is also possible to perform weaving with weft yarns that extend in this direction.

In one embodiment, the yarns used may be silicon carbide (SiC) yarns supplied under the name "Nicalon" by the Japanese supplier Nippon Carbon and having a weight (expressed as a number of filaments) of 0.5K (i.e. 500 filaments).

Naturally, depending on the available yarn weights, various combinations of numbers of yarn layers and variations in thread count and in weight can be adopted in order to obtain the desired profile.

When weaving the fiber blank 300, apart from in the extra thicknesses 303, and when weaving the fiber blank 400, the weaving used may for example be multilayer weaving implemented with a satin or multi-satin type weave. Other types of multilayer weaving could also be used, for example multilayer weaving with a multi-plain weave or with an "interlock" weave. The term "interlock" weave is used herein to mean a weave in which each layer of weft yarns interlinks a plurality of layers of warp yarns with all of the yarns in a given weft column having the same movement in the weave plane.

Various ways of performing multilayer weaving are described in particular in document WO 2006/136755.

FIG. 10A is a warp section view where the strip 302 is crossed by the connection portion 340c of the strip 304 of the fiber blank shown in FIG. 6, the warp yarns of the strip 304 in this connection portion being seen in section. Each layer of warp yarns C304 in this connection portion 340c extends in a direction perpendicular to the weft direction of the strip 302. During weaving, the strip 304 is caused to pass from one side of the strip 302 to the other by causing some of the yarns of the warp yarn layers C304 of the strip 304 to cross individually through all of the warp and weft yarns of the strip 302. The crossing warp yarn layers C304 of the strip 304 pass between the weft yarns t302 of the strip 302 along a rectilinear profile as shown in FIG. 10A. Naturally, depending on the shape desired for the inner platform, the warp yarn layers C304 of the strip 304 could enter and leave the strip 302 along profiles of other shapes, such as profiles that are undulating or curved, for example.

FIG. 10B is a weft section view of the weft yarns t302 and t304 respectively of the strips 302 and 304 where the connection portion 340c of the strip 304 crosses through the strip 302 of the fiber blank shown in FIG. 3. In the example shown, and as mentioned above, the connection portion 340c extends perpendicularly to the direction of the warp yarn layers C302 of the strip 302. Nevertheless, it would also be possible to have a connection portion 340c that extends at a non-zero angle relative to the normal of the warp direction, depending on the orientation desired for the inner platform.

The extra thickness 303 of the fiber blank 300 of FIG. 6 may be obtained by using weft yarns of greater weight and by using additional layers of weft yarns. In a variant embodiment, the extra thickness 302 may be obtained by introducing an insert while weaving the strip 302.

The fiber blank for forming the fiber reinforcement of the blade may also be obtained by stacking a plurality of layers of:
  unidimensional (UD) fabric;
  two-dimensional (2D) fabric;
  braiding;
  knitting;
  felt; and
  a unidirectional (UD) sheet of tows or cables or multidirectional (nD) sheets obtained by superposing a plurality of UD sheets in different directions and linking the UD sheets together, e.g. by stitching, by a chemical bonding agent, or by needling.

The layers may be linked together, e.g. by stitching, by implanting yarns or rigid elements, or by needling.

There follows a description of the successive steps that may be performed in order to shape the fiber preform of an outer platform element or of a blade of the invention, and the densification of the preform.

As described above, a fiber blank for forming the fiber reinforcement of an outer platform element or of a blade is woven by multilayer weaving, or by stacking fiber structures. For turbine engine blades that are for use at high temperature and in particular in a corrosive environment (in particular a wet environment), the yarns used for the weaving are made of ceramic fibers, and in particular of fibers made of silicon carbide (SiC). For lower temperatures, it is also possible to use carbon fibers.

Densification of the fiber preform that is to form the fiber reinforcement of the part that is to be fabricated involves using the material that is to constitute the matrix to fill in the pores of the preform, throughout all or part of its volume. This densification may be performed in known manner using a liquid technique (CVL) or the gas technique of chemical vapor infiltration (CVI), or indeed by chaining both of those methods.

The liquid technique consists in impregnating the preform with a liquid composition containing a precursor for the matrix material. The precursor is usually in the form of a polymer such as a resin, possibly diluted in a solvent. The preform is placed in a mold that may be closed in leaktight manner with a cavity having the final shape for the molded part. Thereafter, the mold is closed and the liquid matrix precursor (e.g. a resin) is injected throughout the cavity in order to impregnate all of the fiber portion of the preform.

The precursor is transformed into a matrix, i.e. it is polymerized, by heat treatment, generally by heating the mold after any solvent has been eliminated and after the polymer has been cured, the preform being maintained at all times in the mold having the shape that corresponds to the shape of the part that is to be made.

When forming a matrix of carbon or of ceramic, the heat treatment consists in pyrolyzing the precursor in order to transform the matrix into a matrix of carbon or of ceramic depending on the precursor used and depending on pyrolysis conditions. By way of example, liquid precursors for ceramic, in particular for SiC, may be resins of the following types: polycarbosilane (PCS); or polytitanocarbosilane (PTCS); or polysilazane (PSZ) type; whereas liquid precursors for carbon may be resins having a relatively high coke content, such as phenolic resins. Several cycles running from impregnation to heat treatment may be performed consecutively in order to reach the desired degree of densification.

In an aspect of the invention, in particular when forming an organic matrix, the fiber preform may be densified by the well-known resin transfer molding (RTM) method. In the RTM method, the fiber preform is placed in a mold having the outside shape of the part that is to be made. A thermosetting resin is injected into the inside space of the mold, which contains the fiber preform. A pressure gradient is generally established in said inside space between the location where the resin is injected and orifices for exhausting said space so as to control and optimize impregnation of the preform with the resin.

In known manner, the fiber preform may also be densified using a gas technique by chemical vapor infiltration (CVI) of the matrix. The fiber preform corresponding to the structure to be made is placed in an oven into which a reaction gas is admitted. The pressure and the temperature that exist in the oven and the composition of the gas are selected so as to enable the gas to diffuse within the pores of the preform so as to form the matrix in the core of the material by depositing solid material in contact with the fibers, the material resulting from decomposing an ingredient of the gas or from a reaction between a plurality of ingredients, as contrasted with the pressure and temperature conditions that are suitable for chemical vapor deposition (CVD) methods that lead to deposition only on the surface of the material.

An SiC matrix may be formed using methyltrichlorosilane (MTS) that gives SiC by the MTS decomposing, whereas a carbon matrix may be obtained with hydrocarbon gases such as methane and/or propane that give carbon by cracking.

Densification combining a liquid technique and a gas technique may also be used in order to facilitate operations, limit costs, and limit fabrication cycles, while obtaining characteristics that are satisfactory for the intended use.

In particular, the matrix may be obtained using epoxy resins, e.g. such as high-performance epoxy resin, or by using liquid precursors for carbon or ceramic matrices.

In the presently-described example, the fiber blank is impregnated by a consolidation composition, typically a resin that is optionally diluted in a solvent. It is possible to use a carbon precursor resin, e.g. a phenolic or a furanic resin, or a ceramic precursor resin, e.g. a polysilazane or a polyoxysiloxane resin that is a precursor for SiC.

After drying to eliminate any solvent from the resin, it is possible to pre-cure the resin. Pre-curing, or incomplete curing, serves to increase stiffness and thus strength while preserving the capacity for deformation that is necessary for making a preform of an outer platform element or of a blade.

The fiber blank, in particular the blank for forming the blade, is cut in a manner shown in FIG. 7.

Thereafter, the blank is shaped (as shown in FIG. 9) and placed in a mold, e.g. made of graphite, in order to shape the overhang and wiper plates of the outer platform when making an outer platform element and the inner platform portion, the root portion, and the airfoil portion when making the blade.

Thereafter, the resin is cured completely and the cured resin is pyrolized. Curing and pyrolysis may be run on one after the other by progressively raising the temperature inside the mold.

After pyrolysis, a fiber preform is obtained that is consolidated with the pyrolysis residue. The quantity of consolidation resin is selected so that the pyrolysis residue binds the fibers of the preform together sufficiently to enable it to be manipulated while conserving its shape without help from tooling, it being understood that the quantity of consolidation resin is preferably selected to be as small as possible.

The consolidated preform is then densified with a matrix. For a turbine engine blade that is to be used at high temperature, and in particular in a corrosive atmosphere, the matrix is a ceramic matrix, e.g. made of SiC. Densification may be performed by CVI, in which case the formation of the interphase second layer and the densification of the matrix may be run on one after the other in the same oven.

Densification may be performed in two successive steps separated by a step of machining the outer platform element or the blade to the desired dimensions.

It should be observed that pre-machining, in particular for beginning to form the opening(s) in the outer platform element and the slot(s) or notch(es) in the outer end of the blade, may be performed after curing and prior to pyrolyzing the resin.

In a variant implementation, the preform may be consolidated by partial densification while being maintained in the shaper, consolidation being performed by depositing ceramic on the fibers by CVI.

The shaper is preferably made of graphite and presents holes for facilitating the passage of reaction gases leading to the interphase and the ceramic being deposited by CVI.

Once consolidation is sufficient to enable the preform to be manipulated while conserving its shape without the existence of supporting tooling, the consolidated preform is extracted from the shaper and densification with a ceramic matrix is performed by CVI. The densification may be performed in two successive steps separated by a step of pre-machining the outer platform element or the blade to the desired dimensions, in particular to begin forming the opening(s) in the outer platform element and the slot(s) or notch(es) in the outer end of the blade, a final machining step being performed on these elements after the second densification step.

In the description above, an airfoil profile of varying thickness is made by using yarns of varying weight and/or thread count. In a variant, it is possible to make the portion of the fiber blank that corresponds to the airfoil preform portion with a certain number of yarn layers having the same weight and constant thread counts, with the variation in the thickness of the profile being obtained during the machining operation after the first step of densification or during a pre-machining operation on the consolidated blade preform.

Depending on the intended conditions of use, it is also possible for the fibers of the fiber reinforcement of the outer platform element and of the blade to be made of a material other than a ceramic, e.g. to be made of carbon, and for the matrix to be made of a material other than a ceramic, e.g. to be made of carbon or of a resin. The outer platform element and the blade of the invention may in particular be made out of a ceramic matrix composite (CMC) material, which is a material made up of reinforcement of carbon or ceramic fibers densified by a matrix that is made of ceramic at least in part, such as a carbon-carbon/silicon carbide (C—C/SiC) material, a carbon/silicon carbide (C/SiC) material, a silicon carbide/silicon carbide (SiC/SiC) material, or a carbon/carbon (C/C) composite material, which in known manner is a material made up of carbon fiber reinforcement densified with a carbon matrix.

Naturally, the invention is also applicable to fabricating outer platform elements and blades out of organic matrix composite (OMC) material, for example such as the material obtained using a high performance epoxy resin.

Figure 11:
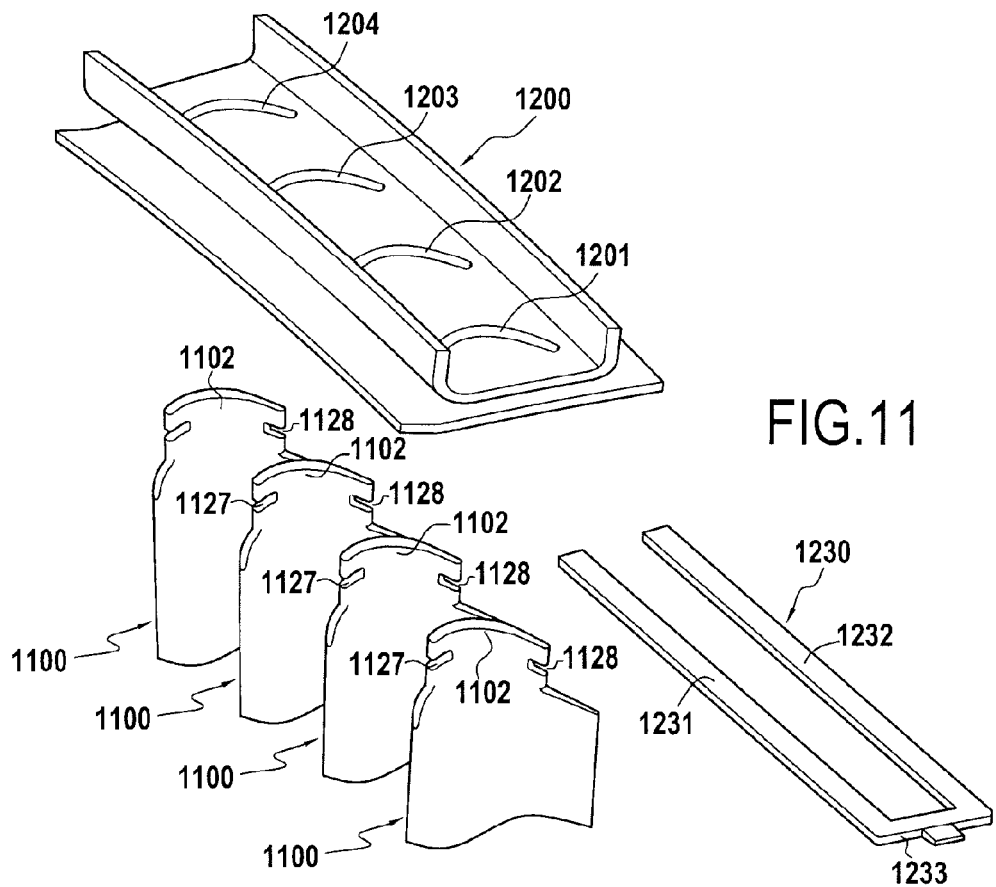
FIGS. 11 and 12 are diagrammatic perspective views of a portion of a rotor in accordance with a variant embodiment of the invention.
Figure 12:
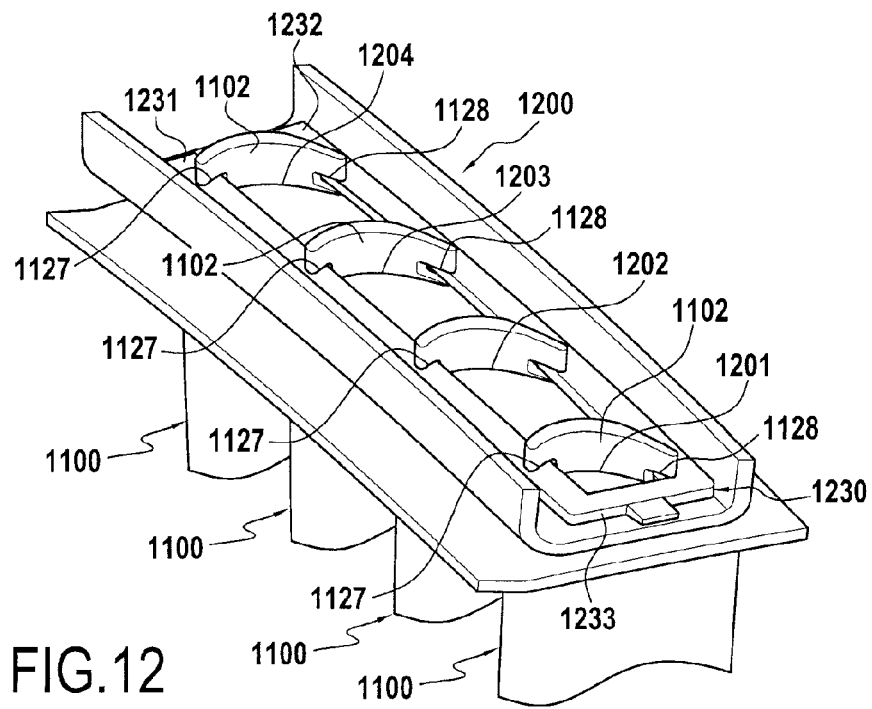

FIGS. 11 and 12 show a variant embodiment that differs from the embodiment described with reference to FIGS. 2 and 3 in that the outer end 1102 of each blade 1100, instead of having a slot, has two notches 1127 and 1128 receiving the arms 1231 and 1232 of a locking element 1230 so as to hold in position an outer platform element 1200 that presents openings (four openings 1201 to 1204 being shown in this example) that have the outer ends 1102 of four blades 1100 engaged therein. Each locking element 1230 also has an abutment element 1233 for co-operating with the free ends of the arms 1231 and 1232 of the adjacent locking element thus making it possible, once all of the locking elements have been put into place, to block the locking elements in position.

FIGS. 13 and 14 show a variant embodiment that differs from that described with reference to FIGS. 2 and 3 in that the outer end 2102 of each blade 2100 has two slots 2127 and 2128 for receiving arms 2231 and 2232 of a locking element 2230 so as to hold in position an outer platform element 2200 that, in this example, presents two openings 2201 and 2202 that receive the outer ends 2102 of two adjacent blades 2100. Each locking element 2230 also has a rim 2233 for co-operating with a housing 2125 formed at one end of each outer platform element so as to make it possible, once the adjacent outer platform element has been put into place as shown in FIG. 14, to block the locking element in position. The housing 2125 is preferably made solely in the wiper plate of the outer platform 2220, thus making it possible to avoid the rim 2233 from penetrating into the flow passage. This avoids disturbing the flow of the stream while maintaining a high degree of sealing.

Furthermore, in the above-described blades, the fiber blank corresponds to a fiber structure woven as a single piece that incorporates not only a first portion for forming the airfoil and the blade root, but also a second portion for forming an inner platform, the second portion being interleaved at least in part with the first portion (yarns of the second portion passing through at least a portion of the first portion).

Nevertheless, the blade of the invention is not limited to such a blade structure.

In general, the blade of the invention covers any type of blade having a first portion constituting the airfoil and the root of the blade and a second portion made independently of the first portion and forming an outer platform element as described above that is fitted on the first portion, the blade possibly also including at least:

a third portion forming all or some of an inner platform with or without overhangs and with or without an anti-tilting rim;

the fiber reinforcement portions corresponding to the first and to the third portions of the blade are mutually interleaved, at least in part, with the yarns of the third fiber reinforcement portion penetrating into the first fiber reinforcement portion, as described in French patent applications Nos. 10/55160 and 10/55161;

a third portion forming some or all of an inner platform with or without overhangs and with or without an anti-tilting rim;

the fiber blank corresponding to the third portion being separate from the fiber blank corresponding to the first portion constituting the airfoil of the blade, and being fastened thereto, e.g. by stitching; and an inner platform element with or without overhangs and with or without an anti-tilting rim, the platform element being fabricated independently of the first and second portions and subsequently being fitted onto the airfoil of the blade as described in international patent application WO 2010/116066.

The invention also applies to twin-blade structures comprising two blades that are connected together, e.g. via a common inner platform.

The invention claimed is:

1. A turbine rotor comprising a plurality of blades of composite material comprising fiber reinforcement densified by a matrix, each blade comprising a blade body extending between an inner end having a blade root and an outer end forming the tip of the blade, wherein the rotor includes a plurality of outer platform elements of composite material comprising fiber reinforcement densified by a matrix, each outer platform element including at least one opening in which the outer end of at least one of the plurality of blades is engaged, a portion of the outer end of each blade that extends beyond the outer platform element including at least one slot or notch for receiving a locking element,
   wherein each outer platform element has an outer platform overhang plate and an outer platform wiper plate, and
   wherein the outer platform wiper plate and the outer platform overhang plate present equivalent lengths in a longitudinal direction of the platform element while being offset relative to each other in said longitudinal direction in order to enable two adjacent outer platform elements to overlap in part and to seal a passage between the two adjacent outer platforms.

2. A rotor according to claim 1, wherein the outer end of each blade presents dimensions that are smaller than the dimensions of the underlying portion of the blade body so as to define a shoulder forming a bearing surface for the outer platform element.

3. A rotor according to claim 1, wherein each outer platform element has a plurality of openings so as to engage each outer platform element with the outer ends of a plurality of adjacent blades.

4. A rotor according to claim 1, wherein the outer end of each blade extending beyond the outer platform element includes two slots or notches, and in that each locking element has two arms respectively engaged in said slots or notches.

5. A rotor according to claim 1, wherein each locking element includes, at one end, a rim that co-operates with a housing formed in each outer platform element so as to hold each locking element in position.

6. A rotor according to claim 1, wherein the fiber reinforcement of each blade is obtained by multilayer weaving of yarns.

7. A rotor according to claim 1, wherein each blade and each outer platform element is made of ceramic matrix composite (CMC) material.

8. A rotor according to claim 1, wherein each blade and each outer platform element is made of organic matrix composite (OMC) material.

9. A compressor fitted with a rotor according to claim 1.

10. A turbine engine fitted with a compressor according to claim 9.

11. A method of fabricating a turbine engine rotor, the method comprising making a plurality of blades, the method comprising for each blade:
   making a blade fiber blank as a single piece;
   shaping the fiber blank so as to obtain a single-piece blade fiber preform having a first portion forming a preform for a blade airfoil and a blade root;
   densifying the blade preform with a matrix in order to obtain a composite material blade having fiber reinforcement constituted by the preform and densified by the matrix, and comprising a blade body extending between an inner end comprising a blade root and an outer end forming a blade tip;
   wherein the method further comprises:
   making at least one slot or notch in the outer end of each blade;
   making at least one single-piece fiber blank for each of a plurality of outer platform elements;
   shaping the fiber blank to obtain an outer platform element fiber preform;
   densifying the outer platform element preform with a matrix to obtain the plurality of outer platform elements of composite material having fiber reinforcement constituted by the preform and densified by the matrix;
   making at least one opening in each outer platform element;
   mounting each blade on a hub by engaging the root of each blade in a housing of complementary shape formed in the periphery of said hub;
   mounting each outer platform element on at least one blade by engaging the outer end of the blade in the opening or notch in the outer platform element, each outer platform element being provided with an outer platform overhang plate and an outer platform wiper plate, the outer platform wiper plate and the outer platform overhang plate presenting equivalent lengths in a longitudinal direction of the platform element while being offset relative to each other in said longitudinal direction in order to enable two adjacent outer platform elements to overlap in part and to seal a passage between the two adjacent outer platforms; and
   arranging a locking element in at least the slot in the outer end of each blade.

12. A method according to claim 11, wherein the outer end of each blade is machined so as to define a shoulder forming a bearing surface for the outer platform element.

13. A method according to claim 11, wherein the fiber blank of each outer platform element is made by multilayer weaving between a plurality of yarn layers, and in that it includes partial zones of non-interlinking between two series of adjacent yarn layers, one of the two series of layers being folded out during shaping of the blank so as to form the outer platform wiper plate.

\* \* \* \* \*